United States Patent [19]

Yanagida et al.

[11] Patent Number: 4,654,729
[45] Date of Patent: Mar. 31, 1987

[54] CASSETTE COVER OPENING MECHANISM

[75] Inventors: Seiichi Yanagida, Hiratsuka; Takao Kiuchi, Fujimi; Hiroyuki Kasami, Kawasaki, all of Japan

[73] Assignees: Kabushiki Kaisha Toshiba, Kawasaki; Fuji Photo Film Co., Ltd., Minamiashigara; Toshiba Audio Video Engineering Co., Ltd., Tokyo, all of Japan

[21] Appl. No.: 613,325

[22] Filed: May 23, 1984

[30] Foreign Application Priority Data

May 31, 1983 [JP] Japan .................. 58-96820

[51] Int. Cl.$^4$ ............................. G11B 23/08
[52] U.S. Cl. ....................... 360/93; 360/95; 360/132; 242/198
[58] Field of Search ........... 360/93, 95, 85, 132; 242/198

[56] References Cited

U.S. PATENT DOCUMENTS

| | | | |
|---|---|---|---|
| 3,900,170 | 8/1975 | Serizawa | 242/198 |
| 3,924,823 | 12/1975 | Cohen et al. | 242/198 |
| 4,017,901 | 4/1977 | Staar | 360/132 |
| 4,485,988 | 12/1984 | Kikuya et al. | 242/198 |

FOREIGN PATENT DOCUMENTS

| | | | |
|---|---|---|---|
| 1157943 | 11/1983 | Canada | 360/93 |
| 56-16975 | 2/1981 | Japan | 360/93 |
| 58-164068 | 9/1983 | Japan | 360/132 |
| 58-164067 | 9/1983 | Japan | 360/132 |
| 58-200477 | 11/1983 | Japan | 360/93 |

Primary Examiner—John H. Wolff
Assistant Examiner—Matthew J. Bussan
Attorney, Agent, or Firm—Cushman, Darby and Cushman

[57] ABSTRACT

A cassette cover opening mechanism has a cassette cover opening member for opening the cassette cover of a tape cassette when the cassette is loaded in a video tape recorder. The opening member has a first abutment portion and a second abutment portion. The first portion abuts against the lower edge of a front plate of the cassette cover to pivot the cover during a first half of the movement of a cassette holder from its first position to its second position. The second portion abuts against the lower edge of one of side plates of the cassette cover to further pivot the cover during a latter half of the movement of the cassette holder.

6 Claims, 11 Drawing Figures

CASSETTE COVER OPENING MECHANISM

BACKGROUND OF THE INVENTION

The present invention relates to a cassette cover opening mechanism for a magnetic recording/reproducing apparatus and, more particularly, for a video tape recorder (VTR).

A tape cassette for use in a VTR generally has a box-like case in which a magnetic tape wound on a pair of reels is housed. The front side of the cassette case opens to define a tape loading port. The tape loading port is opened/closed by a cassette cover which is pivotally mounted on the cassette case. The cassette cover has a front plate for opening/closing the tape loading port and a pair of side plates extending from the two ends of the front plate. The side plates are pivotally mounted on the side surfaces of the cassette case. The cassette cover is normally biased by a coil spring or the like to keep the tape loading port closed.

When the tape cassette is to be loaded in a tape recorder, the cassette is first inserted into a cassette holder. Then, the cassette holder holding the cassette therein is pressed to the drive position. While the holder is moved downward, the cassette cover is pivoted upward since the lower edge of the front plate abuts against a cover opening member of the tape recorder. Thus, the tape loading port is opened. Thereafter, part of the magnetic tape inside the cassette is drawn out through the tape loading port and is engaged with a driving means, a transducer and the like of the tape recorder.

However, in a conventional mechanism, the opening member abuts against the cassette cover after the cassette holder is moved downward considerably, so that the cassette cover starts to be opened at a relatively late timing. For this reason, the cassette holder may move to the lowermost position before the cassette cover fully opens. In this case, if a guide post, a loading post or the like is arranged below the cassette cover, the cover may abut against the post or the like. When the cassette cover is not fully open, the drawing operation of the magnetic tape may be interfered with. With the recent trend toward smaller and thinner tape recorders, the downward stroke of the cassette holder is becoming shorter. The above-mentioned problem is more notable if the downward stroke is shorter.

The level of the cover opening member can be raised so as to open the cassette cover at an early timing. However, in this case, the opening member is caught by the front plate of the cassette cover, and the cassette holder cannot be moved to the drive position. For this reason, the adjustable range of the position of the opening member for the purpose of opening the cassette cover at an early timing is limited.

SUMMARY OF THE INVENTION

The present invention has been made in consideration of the above circumstances and has as its object to provide a cassette cover opening mechanism which can open a cassette cover at an early timing and which allows a tape cassette to be loaded in a state that the cassette cover is fully open.

According to an aspect of the present invention, a cassette cover opening mechanism has a cover opening member for opening a cassette cover of a tape cassette upon the movement of the cassette holder. The opening member has first and second abutment portions. During the initial period of the movement of the cassette holder, the first abutment portion abuts against the front plate of the cassette cover to start the pivotal movement of the cassette cover. During the latter stage of the movement of the cassette holder, the second abutment portion abuts against one of the side plates of the cassette cover to pivot the cassette cover to its fully open position.

According to the opening mechanism of the present invention, the first abutment portion can start opening the cassette cover immediately after the cassette holder starts moving. The second abutment portion abuts against one of the side plates of the cassette cover to pivot the cassette cover. Therefore, the cassette cover can be fully opened without catching the opening member.

DETAILED DESCRIPTION OF THE PREFERRED EMBODIMENT

The preferred embodiment of the present invention will now be described with reference to the accompanying drawings.

Figure 1:
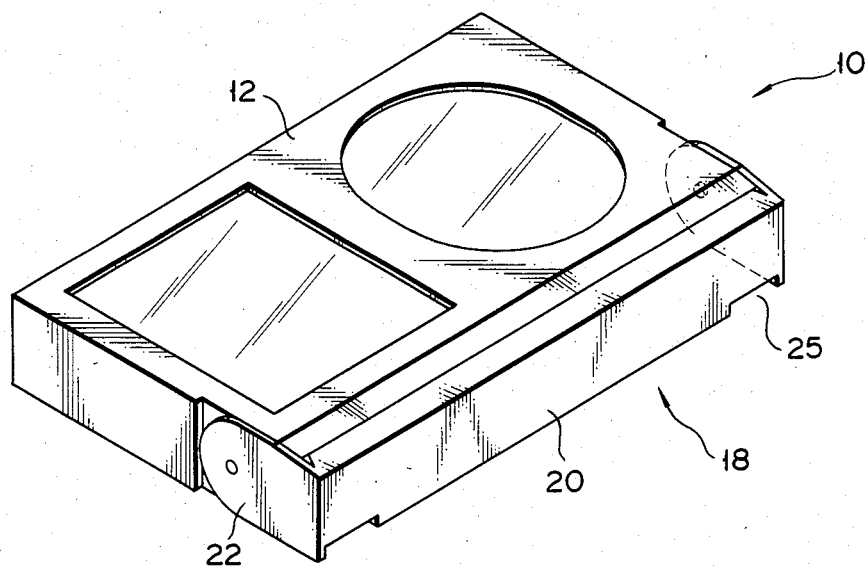
FIGS. 1 and 2 are respectively a perspective view and a rear view of a tape cassette wherein a cassette cover is closed.
Figure 2:
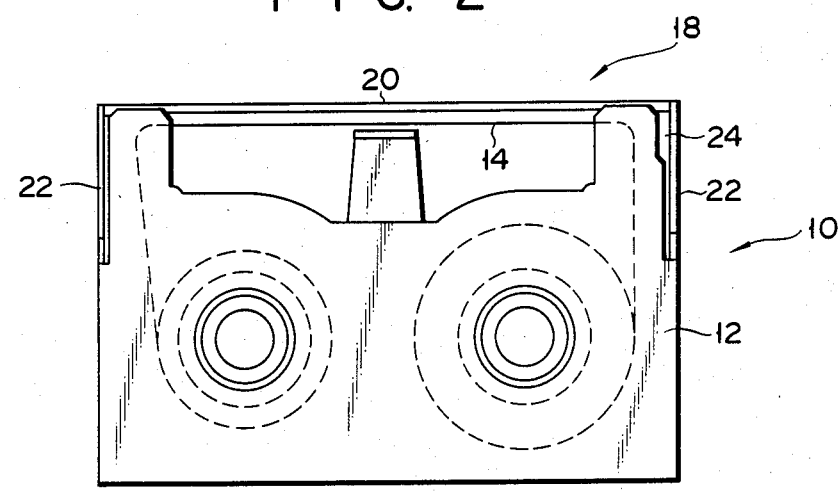
Figure 3:
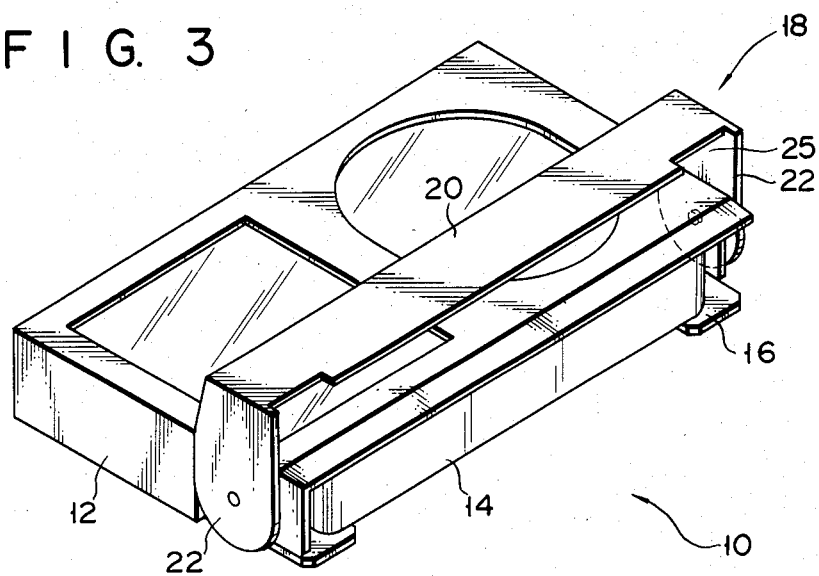
FIG. 3 is a perspective view of the tape cassette wherein the cassette cover is open.

FIGS. 1 to 3 show a tape cassette 10. The tape cassette 10 has a cassette case 12 of a substantially rectangular box-like shape. Magnetic tape 14 wound around a pair of reels is housed inside the case 12. The front of the cassette case 12 is opened to define a tape loading port 16. The cassette 10 has a cassette cover 18 for opening/closing the tape loading port 16. The cassette cover 18 has a front plate 20 having a shape corresponding to that of the tape loading port 16, and a pair of side plates 22 perpendicularly extending from the ends of the front plate 20. The side plates 22 are pivotally mounted on the side surfaces of the cassette case 12, respectively. Thus, the cassette cover 18 is pivotal between a closed position (FIG. 1) where the front plate 20 opposes the tape loading port 16 to close it and a fully open position (FIG. 3) where the front plate 20 is substantially parallel to the upper surface of the cassette case 12. It is to be noted that the tape loading port 16 is opened when the cover 18 is at the fully open position. The cassette cover 18 is normally biased to the closed position by a biasing member (not shown), for example a spring. A slit 24 for receiving the first abutment portion of an opening member to be described later is formed between one side plate 22 and the corresponding side surface of the cassette case 12.

Figure 4:
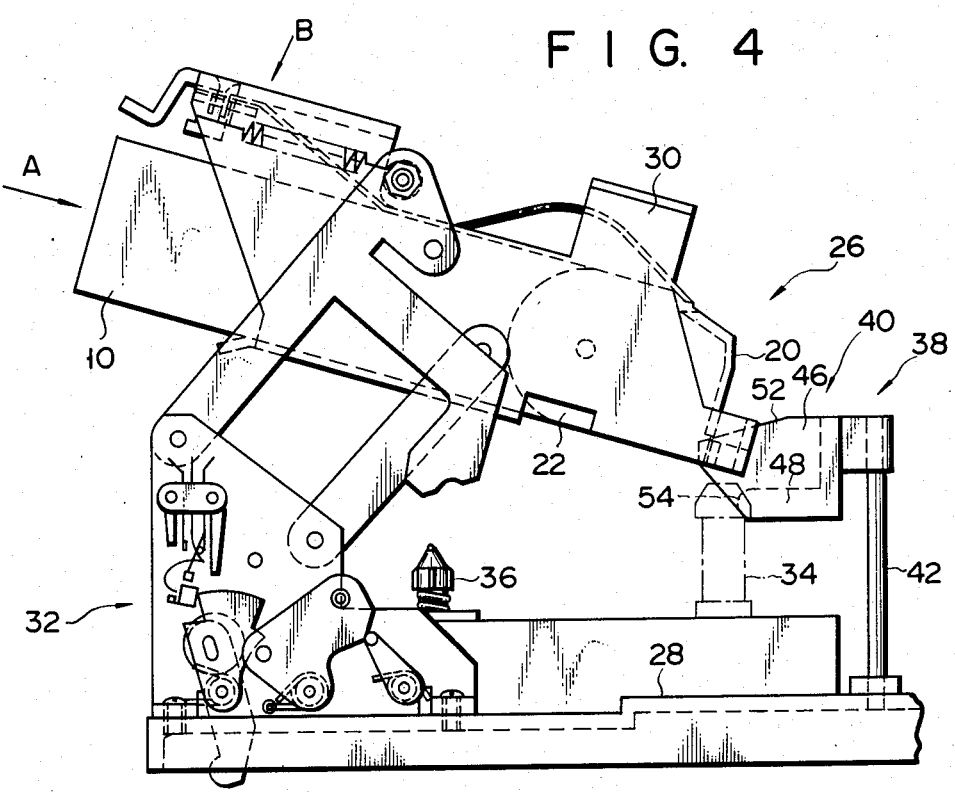
FIG. 4 is a side view schematically showing a video tape recorder wherein the cassette holder is at its first position.
Figure 8:
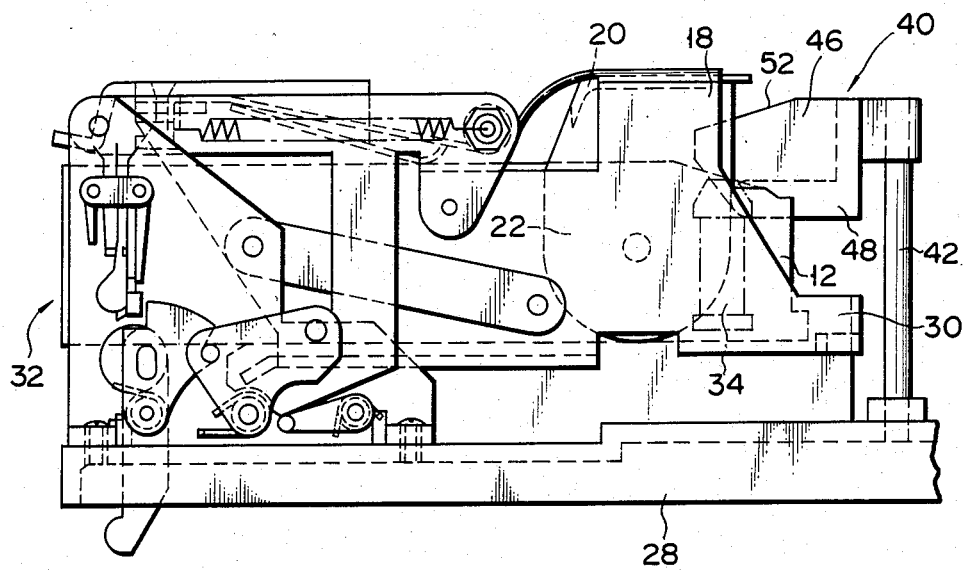
FIG. 8 is a side view schematically showing the tape recorder wherein the cassette holder is at its second position.

As shown in FIG. 4, a video tape recorder (VTR) 26 for driving the tape cassette 10 has a base 28 and a cassette holder 30 for housing the cassette. The holder 30 is supported on the base 28 by a support mechanism 32. The holder 30 is movable between a first position where the tape cassette 10 can be inserted or ejected and a second position (FIG. 8) for driving the cassette. In FIG. 4, reference numeral 34 denotes a tape guide post, and reference numeral 36 denotes a reel driving shaft.

The tape recorder 26 has a cassette cover opening mechanism 38 according to the present invention. The mechanism 38 has a cassette cover opening member 40 for opening the cassette cover 18 of the tape cassette 10 inside the holder 30 when the holder is moved from the first position to the second position. The opening member 40 is supported at the upper end of a support shaft 42 extending upright from the base 28 and is adjustable in the vertical position. In other words, the opening member 40 is adjustable in position relative to the holder 30.

Figure 5:
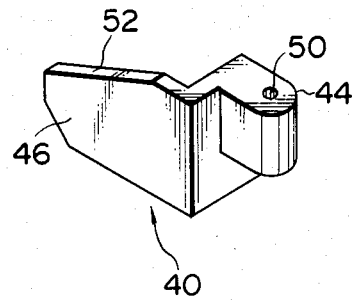
FIGS. 5 and 6 are perspective views of the cover opening member.
Figure 6:
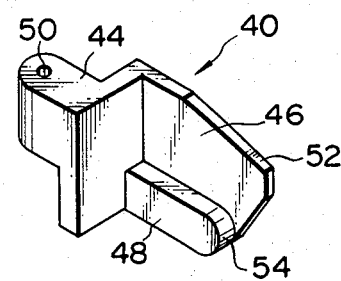

As shown in FIGS. 5 and 6, the opening member 40 has a base portion 44, a first abutment portion 46 of a plate-like shape extending from the base portion, and a second abutment portion 48 of an arm-like shape extending from the base portion. The base portion 44 has a through hole 50 into which the support shaft 42 is inserted. In a state that the opening member 40 is mounted on the support shaft 42, the first abutment portion 46 is held perpendicularly to the base 28 and can be inserted into the slit 24 of the tape cassette 10. The upper edge of the first abutment portion 46, that is, the edge of the first abutment portion located at a upstream side of the movement of the holder 30 from its first position to its second position is tapered to define an abutment edge 52 for abutment against the lower edge of the front plate 20 of the tape cassette 10. In this embodiment, the abutment edge 52 abuts against a notch 25 formed in the lower end portion of the front plate 20. The second abutment portion 48 is arranged below the first abutment portion 46. In other words, the second abutment portion 48 is arranged at a downstream side of the movement of the holder 30. The extended end of the second abutment portion 48 is formed into an arcuated shape to define an abutment surface 54 for abutment against the lower edge of one of the side plates 22 of the cassette cover 18. The abutment surface 54 is at a level lower than that of the abutment edge 52. The base portion 44 and the first and second abutment portions 46 and 48 are formed integrally from a synthetic resin or the like. However, these components 44, 46 and 48 can be separate members.

The operation of the opening mechanism having the above configuration will now be described.

Figure 7A:
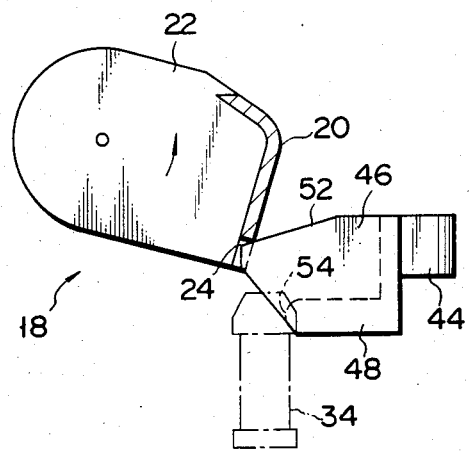
FIGS. 7a to 7d are side views schematically showing the steps of opening the cassette cover, respectively.

First, as shown in FIGS. 4 and 7a, when the tape cassette 10 is inserted into the cassette holder 30 in the direction indicated by arrow A, the distal end of the first abutment portion 46 of the opening member 40 is entered into the slit 24 of the cassette and the abutment edge 52 abuts against the lower edge of the front plate 20 of the cassette cover 18. When the cassette holder 30 is pushed in the direction indicated by arrow B, the cassette cover 18 is immediately pushed upward by the first abutment portion 46 and is pivoted. In this manner, the cassette cover 18 starts to be opened simultaneously as the cassette holder 30 begins to move from the first position to the second position.

Figure 7B:
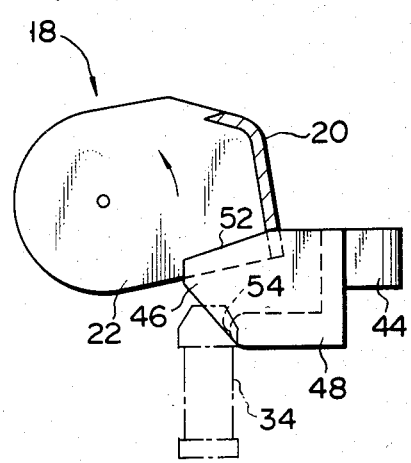
Figure 7C:
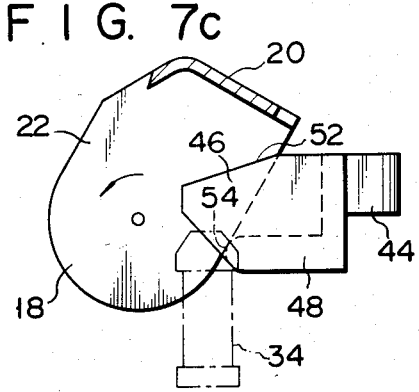
Figure 7D:
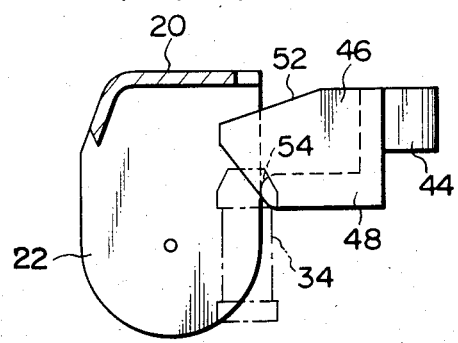

With the movement of the cassette holder 30, the lower edge of the front plate 20 slides over the abutment edge 52 of the first abutment portion 46 and the cassette cover 18 is further pivoted upward, as shown in FIG. 7b. Upon the further movement of the cassette holder 30, as shown in FIG. 7c, the abutment surface 54 of the second abutment portion 48 abuts against the lower edge of one of the side plates 22 of the cassette cover 18. Substantially at the same time, the lower edge of the front plate 20 is separated from the abutment edge 52. Thereafter, while the holder 30 reaches the second position shown in FIG. 8, the cassette cover 18 is pushed upward by the second abutment portion 48 and is finally opened to the fully open position, as shown in FIG. 7d.

The magnetic tape 14 inside the cassette 10 is drawn into the tape recorder from the cassette by a tape loading mechanism (not shown). The drawn portion of the tape is guided by the guide post 34 and the like to be set on a tape travel path.

According to the cassette cover opening mechanism 38 having the construction as described above, upon the movement of the cassette holder 30 from the first position to the second position, the cassette cover 18 can be started to open by means of the first abutment portion 46. Furthermore, since the second abutment portion 48 abuts against the lower edge of one of the side plates 22 of the cassette cover 18, the cassette cover 18 can be opened to the fully open position without catching the opening member. In other words, the opening mechanism 38 can open the cassette cover 18 quickly and to a satisfactory degree. Therefore, the cassette cover is prevented from abutting against the guide post, the loading post or the like during the movement of the cassette holder 30. Furthermore, the magnetic tape, the loading post or the like may not catch the cassette cover during tape loading. These advantages are particularly notable in a compact, thin tape recorder.

The present invention is not limited to the particular embodiment described above, and various changes and modifications may be made within the spirit and scope of the present invention. For example, the shapes of the respective portions of the opening member can be changed as needed. The present invention is not limited to a video tape recorder having a inclined loading-type cassette holder but can be applied to a tape recorder of a front loading type having a vertical loading-type cassette holder. In the embodiment described above, the opening member is supported by the support arm. However, the opening member need only be arranged at a predetermined position and can be directly arranged on the base of the tape recorder.

What is claimed is:

1. A cassette cover opening mechanism for opening a cassette cover of a tape cassette as the tape cassette is loaded into a recording/reproducing apparatus; said cassette including a cassette case holding a magnetic tape therein and having a tape loading port defined at a front portion thereof, a cassette cover for opening/closing the tape loading port, said cover having a front plate opposing the tape loading port and a pair of side plates extending from ends of the front plate, with said side plates pivotally mounted at side surfaces of the cassette case, respectively, and a slit formed between the cassette case and one of the side plates; said recording/reproducing apparatus including a main body and a cassette holder for holding the tape cassette therein, the cassette holder being mounted on the main body to be movable between a first position at which the tape cassette can be inserted therein and a second position at which the tape within the cassette can be driven; said opening mechanism comprising:

a cassette cover opening member, arranged in a travel path of the cassette holder, for opening the cassette cover upon engagement with the cassette cover of the tape cassette inside the cassette holder, when the cassette holder is moved from the first position to the second position, the opening member having two discrete and spaced apart abutment surfaces, with the first abutment surface for abutting against the front plate of the cassette cover to pivot the cassette cover during a first half of the movement of the cassette holder, and a second distinct abutment surface for abutting against either one of the side plates of the cassette cover to further pivot the cassette cover and to further open the tape loading port during a latter half of the movement of the cassette holder.

2. A mechanism according to claim 1, wherein said first abutment surface has a plate-like shape, is arranged to be inserted into the slit of the tape cassette inside the holder during the first half of the movement of the holder, and has an inclined abutment edge abutting against the front plate.

3. A mechanism according to claim 2, wherein said second abutment surface has an arcuated abutment surface for abutting against the one of the side plates, the arcuated abutment surface is located closer to the downstream side of the movement of the cassette holder than the abutment edge is, and the abutment edge is separated from the front plate upon engagement of the arcuated abutment surface with the one of the side plates when the cassette holder moves to the second position.

4. A mechanism according to claim 1, wherein said first and second abutment surface are formed integrally with each other.

5. A mechanism according to claim 1, wherein said opening member is arranged to be adjustable in position relative to the cassette holder.

6. A mechanism according to claim 1, wherein said first abutment surface is arranged to abut against the edge of the front plate which is located at the downstream side of the movement of the cassette holder, and the second abutment surface is arranged to abut against the edge of the one of the side plates which is located at the downstream side of the movement of the cassette holder where said downstream side is downstream at the start of the motion of the cassette holder.

* * * * *